June 5, 1962 D. P. DOLBY 3,037,290

MEANS FOR DETERMINING TAPE POSITION IN RELATION TO TIME

Filed July 29, 1959

DALE P. DOLBY
*INVENTOR.*

BY Fleher and Swain
ATTORNEYS 3,037,290
Patented June 5, 1962

1

3,037,290

MEANS FOR DETERMINING TAPE POSITION IN RELATION TO TIME

Dale P. Dolby, Cupertino, Calif., assignor to Ampex Corporation, Redwood City, Calif., a corporation of California Filed July 29, 1959, Ser. No. 830,411
1 Claim. (Cl. 33—129)

This invention relates to tape timers and more particularly to tape timers for wide tape transport systems.

In order to locate information accurately on recorded tape, it is customary to measure the length of tape recorded. Such measurement is usually obtained by rotating an idler with the tape itself. The rotating idler is connected through a gear train to an indicator, either calibrated in time or in length of tape expired. At relatively low speeds, the rotation of an idler is a simple matter, the tape being in intimate contact with the idler surface. However, if the speed of the tape is increased an air cushion forms between the tape and the idler. Slippage is thus introduced between the tape and the idler wheel thereby giving a false reading of the amount of tape expired.

When relatively narrow tape is employed the idler wheel may be provided with one or more circumferential grooves which prevent entrapment of the air and the ensuing slipping of the tape. However, when relatively wide tape is employed and in particular in machines having a rotary head transducer assembly of the type shown in Patent No. 2,866,012, such an idler may develop a permanent set in the tape which will interfere with the operation of the apparatus and may in time result in excessive wear of the tape.

It is, therefore, an object of this invention to provide a tape timer which is capable of accurately indicating the amount of expired tape regardless of the speed of the tape.

It is another object of this invention to provide a tape timer having an idler in which intimate contact is maintained between the tape and the idler surface itself.

It is a further object of this invention to provide an improvement in tape timers wherein the same narrow surfaces of a grooved idler are not continually presented to the tape.

It is still a further object of the present invention to provide a grooved idler in which the same surfaces are not continuously presented to a tape associated therewith.

In the present invention an idler wheel having a grooved surface which presents various surfaces to the tape is operably connected to a tape timer. The grooved surface of the idler acts as an air passage between the surface of the idler immediately under the tape and that surface which is not covered by the tape. Air which otherwise would be captured by the tape and the idler is freely passed to the atmosphere from a surface not covered by the tape. Since the air can escape the area between the tape and the idler, there is no air cushion between these two components. Consequently slippage is kept at a minimum. Because of the configuration of the groove the same narrow idler surfaces are not continually presented to the tape. Consequently deformation and wear of the tape are held at a minimum.

Referring to the drawing:

2

Figure 1:
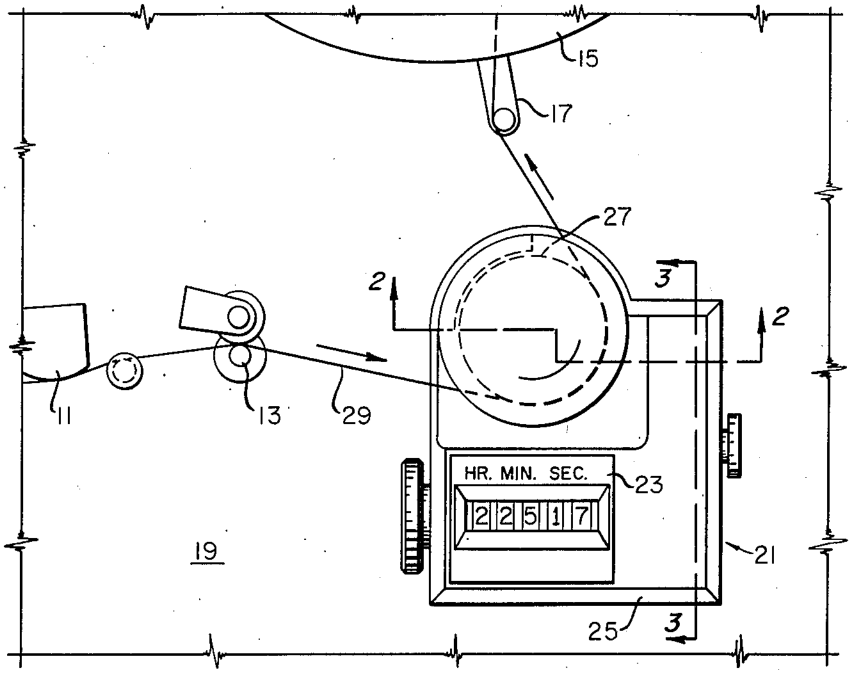
FIGURE 1 shows a plan view of the tape transport mechanism utilizing this invention.

Referring to FIGURE 1, a recording head 11, a drive capstan 13, a take-up reel 15, and a compliance arm 17 are conventionally mounted onto a tape deck 19. Additionally, the tape timer 21 is mounted onto the tape deck. The tape timer 21 comprises an indicating means 23, a gear box 25 and an idler 27. A tape 29 is disposed to pass by the magnetic head 11, the drive capstan 13, the idler 27 of the tape timer 21, and compliance arm 17 to the take-up reel 15.

Figure 2:
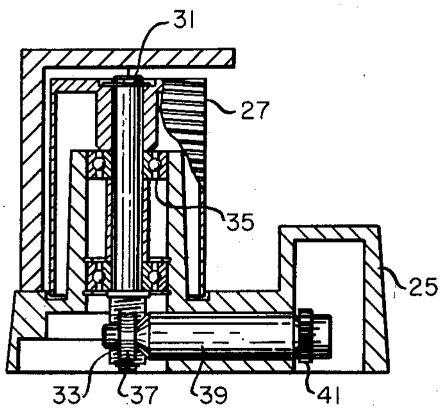
FIGURE 2 shows a cross-sectional view along the line 2—2 of FIGURE 1.

Referring to FIGURE 2, the idler 27 is rigidly fastened to the shaft 31 having a threaded end forming a worm 33. The shaft 31 is rotatably mounted in bearings 35. The worm 33 of the shaft 31 is meshed with the worm wheel 37, of the shaft 39. The opposite end of the shaft 39 is connected to a gear train 41 which in turn actuates a timer 21.

In operation, the tape 29 is driven by the drive capstan 13 thereby pulling it past the recording head 11. The take-up reel is caused to rotate at such a velocity as to take up that amount of tape which is driven by the capstan 13. As the tape is pulled past the idler 27, the idler is rotated thereby causing the shaft 31 to rotate and consequently the gear train 41 and the timer 21 to be actuated. In order for the timing to be accurate, the idler must rotate such that its peripheral velocity is equal to the velocity of tape. It is consequently necessary to have a contact between the tape 29 and the idler 27 with maximum friction. Since an air cushion therebetween would reduce the friction it is necessary to eliminate the air. In order to prevent the air cushion, the idler 27 is grooved so as to allow air, which would under ordinary circumstances be captured between the tape and the idler itself, to be easily passed away from the tape area.

Figure 3:
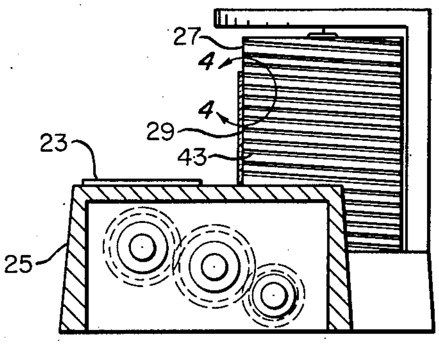
FIGURE 3 shows a cross-sectional view along the line 3—3 of FIGURE 1.
Figure 4:
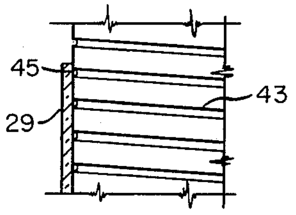
FIGURE 4 is a detailed view of the drum as shown along the line 4—4 in FIGURE 3.

FIGURES 3 and 4 show more detailed views of the idler itself. The idler is in the shape of the conventional drum. However, on the surface of the idler is a helical groove 43. Air which would ordinarily be captured between the tape 29 and the idler 27, is caught in a duct 45 formed by the helical groove 43 and the tape 29. The air is passed along this helical groove to a surface which is not covered by the tape and consequently is released to the atmosphere. By allowing free passage of the air from the groove 43 to the atmosphere, the air cushion between the tape 29 and the idler 27 is destroyed. Consequently, there is intimate contact with the tape and the idler and the linear velocity of each will be equal. Having equal linear velocity, accurate readings of the tape time can easily be determined by conventional gear and counter methods.

Although the groove 43 is shown to be helical, such groove may be of several other configurations. However, the configuration should be such so as not to cause deformation or excessive wear on the tape itself. Utilizing the helical groove provides an overall tape wear which is constant throughout the tape and a freedom from deformation of the tape as a result of continually changing the contact surfaces of the idler as presented to the tape, particularly on repeated passages of the tape past the idler. It is apparent that still other types of groove surfaces may be employed and still retain the feature of this invention.

I claim:

In a timing system for substantially non-porous tape, an idler mounted for engagement with and rotation by said tape, said idler being cylindrical in form and having a single helical groove formed in the cylindrical surface thereof, the turns of said helical groove being spaced apart for a distance substantially greater than the width of said groove.

References Cited in the file of this patent

UNITED STATES PATENTS

| | | |
|---|---|---|
| 1,601,154 | Wheeler | Sept. 28, 1926 |
| 2,757,456 | Handa | Aug. 7, 1956 |

FOREIGN PATENTS

| | | |
|---|---|---|
| 25,758 | Great Britain | Nov. 8, 1909 |
| 448,730 | Great Britain | June 15, 1936 |